(12) United States Patent
Ngan (10) Patent No.: US 8,375,313 B2
(45) Date of Patent: Feb. 12, 2013

(54) USER INTERFACE GENERATION WITH SCORING

(75) Inventor: Christopher Ngan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 345 days.

(21) Appl. No.: 12/791,494

(22) Filed: Jun. 1, 2010

(65) Prior Publication Data

US 2011/0296309 A1 Dec. 1, 2011

(51) Int. Cl.
*G06F 3/00* (2006.01)

(52) U.S. Cl. .......... 715/762; 700/92; 717/100; 717/101; 382/209; 382/217; 382/218; 382/219

(58) Field of Classification Search .................. 715/762
See application file for complete search history.

(56) References Cited

U.S. PATENT DOCUMENTS

| | | | |
|---|---|---|---|
| 6,189,138 B1 | 2/2001 | Fowlow et al. | |
| 6,990,654 B2 | 1/2006 | Carroll, Jr. | |
| 7,194,473 B1 | 3/2007 | Hichwa et al. | |
| 7,543,268 B2 | 6/2009 | Cherdron et al. | |
| 7,571,426 B2 | 8/2009 | Carroll, Jr. | |
| 7,581,206 B2 | 8/2009 | Saad et al. | |
| 7,735,062 B2 * | 6/2010 | de Seabra e Melo et al. | 717/120 |
| 7,778,866 B2 * | 8/2010 | Hughes | 705/7.42 |
| 7,907,719 B2 * | 3/2011 | Bushey et al. | 379/265.01 |
| 8,095,482 B2 * | 1/2012 | Dalal et al. | 706/12 |
| 2005/0278623 A1 * | 12/2005 | Dehlinger et al. | 715/517 |
| 2006/0271856 A1 * | 11/2006 | Raymond et al. | 715/730 |
| 2007/0192678 A1 | 8/2007 | Tang et al. | |
| 2008/0065606 A1 * | 3/2008 | Boys et al. | 707/3 |
| 2008/0307312 A1 | 12/2008 | Misra et al. | |
| 2011/0107243 A1 * | 5/2011 | Jain et al. | 715/762 |

OTHER PUBLICATIONS

Luka Pavlic et al.; "Improving Design Pattern Adoption with Ontology-Based Design Pattern Repository"; Proceedings of the ITI 2008 30th Int. Conf. on Information Technology Interfaces; Jun. 23-26, 2008; Cavtat, California; pp. 649-654. http://ieeexplore.ieee.org/stamp/stamp.jsp?tp=&arnumber=4588487&isnumber=4588363.

* cited by examiner

*Primary Examiner* — Alvin Tan
(74) *Attorney, Agent, or Firm* — Squire Sanders (US) LLP (57) ABSTRACT

A system assists in user interface generation by using scoring and providing viable component options to a developer. The system receives a new user interface that comprises a plurality of components and compares the new user interface against a plurality of repository benchmark user interfaces. The system then determines a score for the new user interface and at least one of the benchmark user interfaces. The score measures a level of deviation between the new user interface and the at least one benchmark user interface.

17 Claims, 11 Drawing Sheets

Page Scoring Results

Scoring Results 710

| Benchmark Repository | | Development Repository | | Other Repository | |
|---|---|---|---|---|---|
| Page bx | 96% | Page cx | 96% | Page cx | 96% |
| Page by | 96% | Page cy | 98% | Page cy | 98% |
| Page by | 99% | Page cy | 99% | Page cy | 98% |

805

Select Detailed Comparisons

| New Page | Benchmark Page bx | Deviation |
|---|---|---|
| ⊟ Layout Component | ⊟ Layout Component | |
|   Panel |   Panel | |
|     Input Text |     Group Component | ▲ |
|     Select Choice |       Output text | |
|     Table Component |     Select Choice | |
|     Input Text |     Table Component | |
| |     Input text | |

810

Select Properties Comparisons

| Input Text | | Output Text | |
|---|---|---|---|
| Refresh | Yes | Refresh | No |
| Enabled | True | Enabled | False |
| Visible | True | Visible | False |

USER INTERFACE GENERATION WITH SCORING

FIELD

One embodiment is directed generally to a computer system, and in particular to a user interface generation computer system.

BACKGROUND INFORMATION

A user interface, such as a web page, provides the interaction between humans and the machine/computer. The typical user interface is composed of basic elements or "components", such as buttons, check boxes, dropdown lists, images, labels, radio buttons, text boxes, grids, etc.

Development systems exist that facilitate the design of user interfaces. For example, some development systems provide templates of components, and the user interface designer can drag and drop the components on a canvas to create the user interface. These development systems can also ensure that multiple web pages within a single web site share common components and have a consistent look and feel.

A corporation or organization typically has standards and conventions for all user interface designs. These standards and conventions are in place to ensure component correctness and consistency, and to result in properly functioning code and ease of maintenance. However, it is difficult for an organization to bring awareness to all the standards and conventions to a disparate group of user interface developers, and to ensure that completed designs are done correctly.

SUMMARY

One embodiment is a system for assisting in user interface generation by using scoring and providing viable component options to a developer. The system receives a new user interface that comprises a plurality of components and compares the new user interface against a plurality of repository benchmark user interfaces. The system then determines a score for the new user interface and at least one of the benchmark user interfaces. The score measures a level of deviation between the new user interface and the at least one benchmark user interface.

DETAILED DESCRIPTION

One embodiment is a user interface ("UI") generation system that uses scoring and a Best Practice Composite Component repository ("BPCC" or "benchmark repository") to aid a user interface developer in complying with an organization's standards and conventions, and to make the development process more efficient by utilizing existing UI designs.

Figure 1:
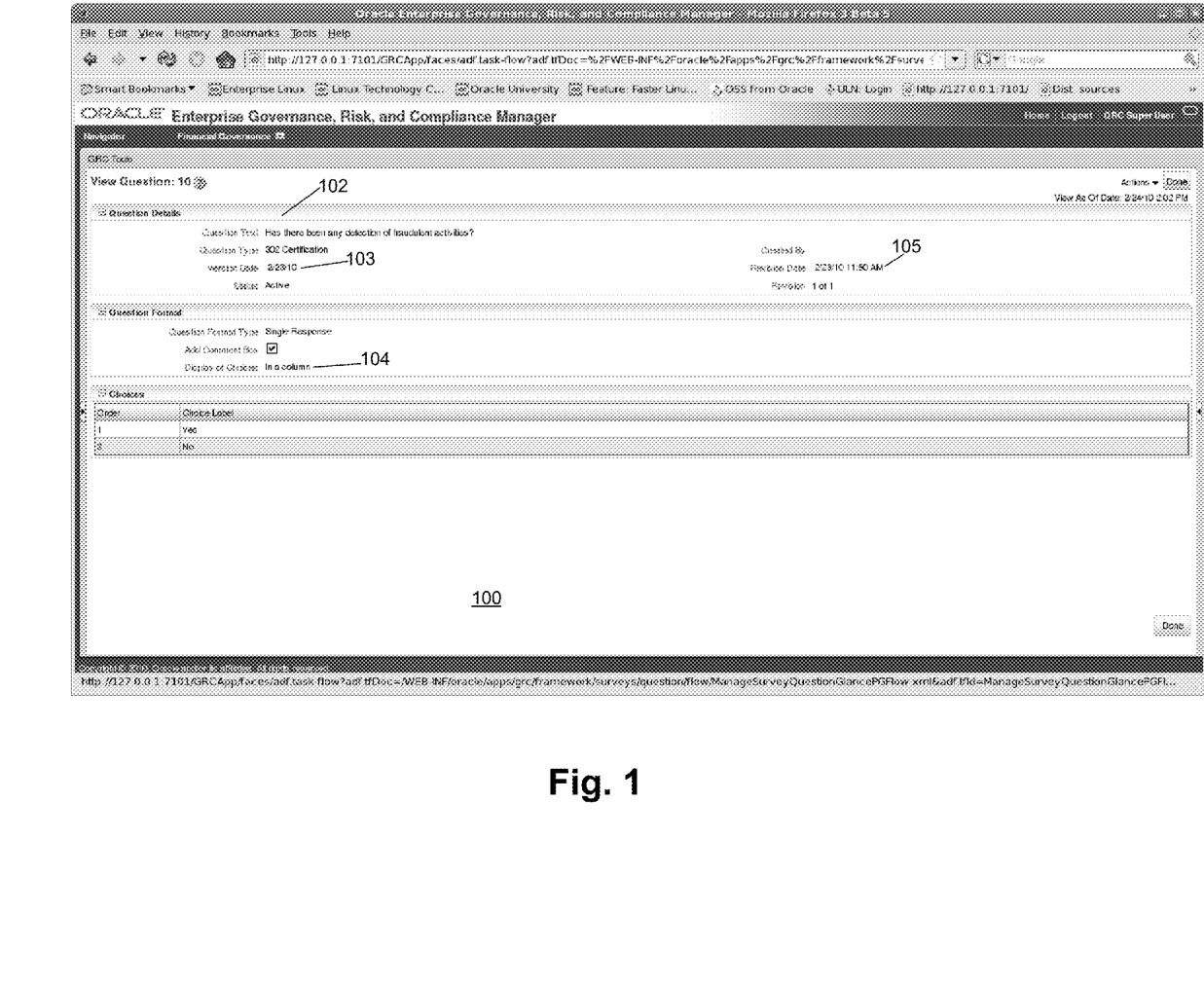
FIG. 1 illustrates a typical user interface or web page.
Figure 2:
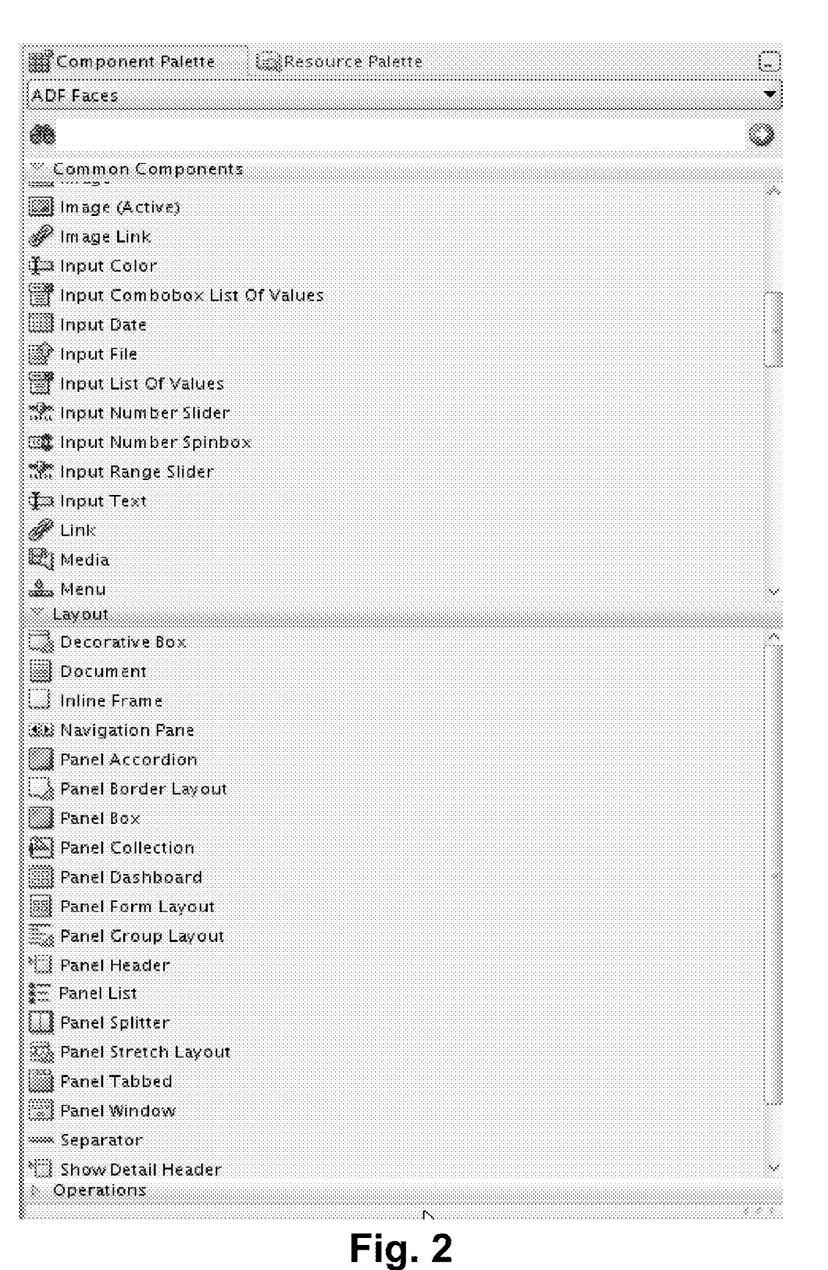
FIG. 2 illustrates a partial list of common components that are available to a developer using one known development tool.

For example, UI 100 includes a panel header 102, an input date 103, and an input list of values 104. In generating a UI such as UI 100, a UI developer will typically use a development tool such as JDeveloper from Oracle Corp. These types of tools allow a developer to develop a UI by choosing and composing the available components from a palette of commonly used components. The components typically can be dragged and dropped to compose the UI. However, the choice of available components can be large. For example, FIG. 2 illustrates a partial list of common components that are available to a developer using one known development tool.

Figure 3:
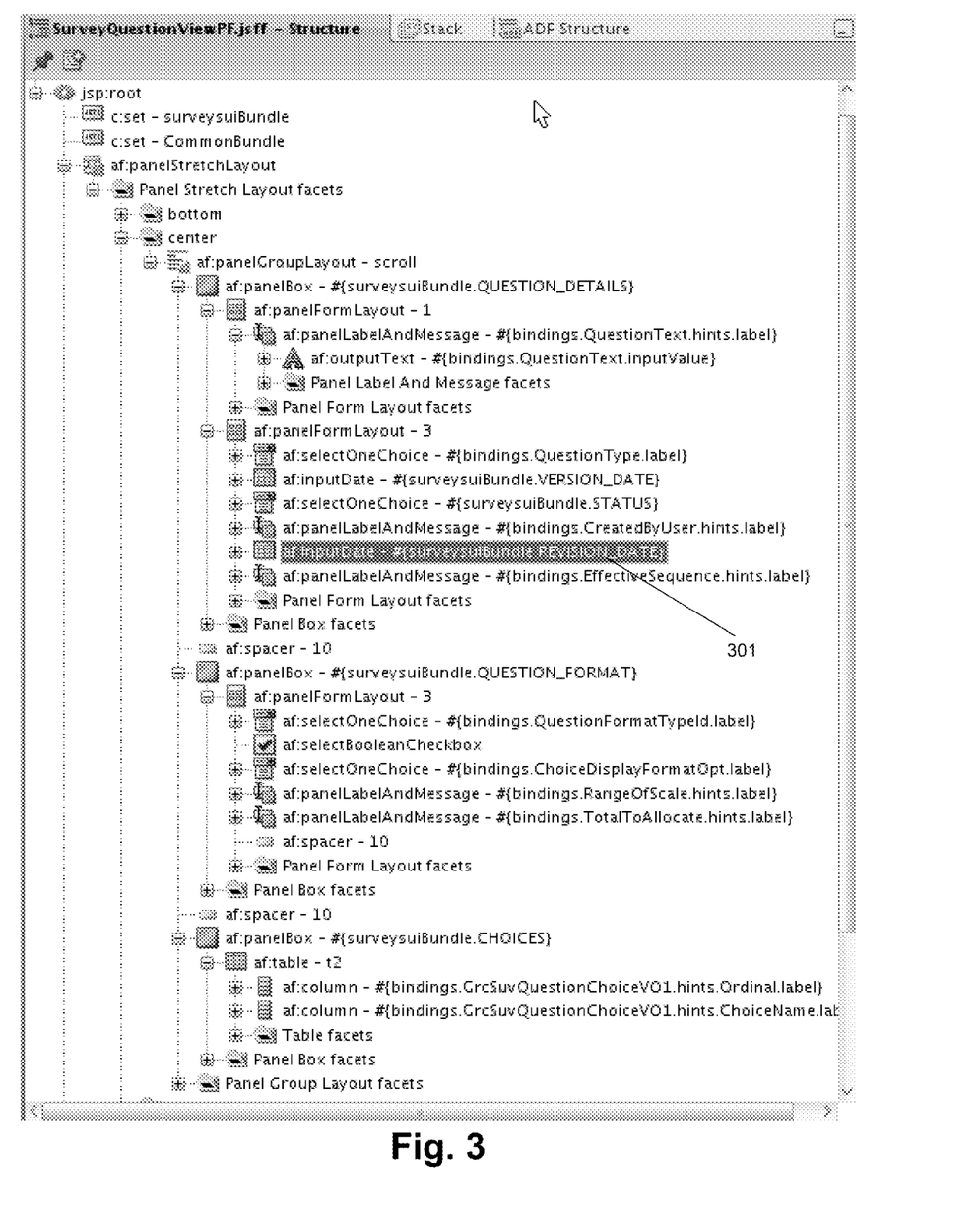
FIG. 3 illustrates an example level of nesting for field of a user interface.

In addition to choosing the correct components, a developer is typically required to compose and layer the components for the page to display and function correctly. Even with a relatively simple page such as UI 100 of FIG. 1, there exists a complex composition of components to construct the page. For example, the "Revision Date" field 105 in the "Question Details" region of FIG. 1 in one embodiment is nested inside four layers of components. FIG. 3 illustrates this level of nesting for "Revision Date" field 105 at line 301. A developer typically has different nesting options for each component. A developer may choose a different nesting, as well as nesting with different components, in order to provide different visual effects and functionality.

Figure 4:
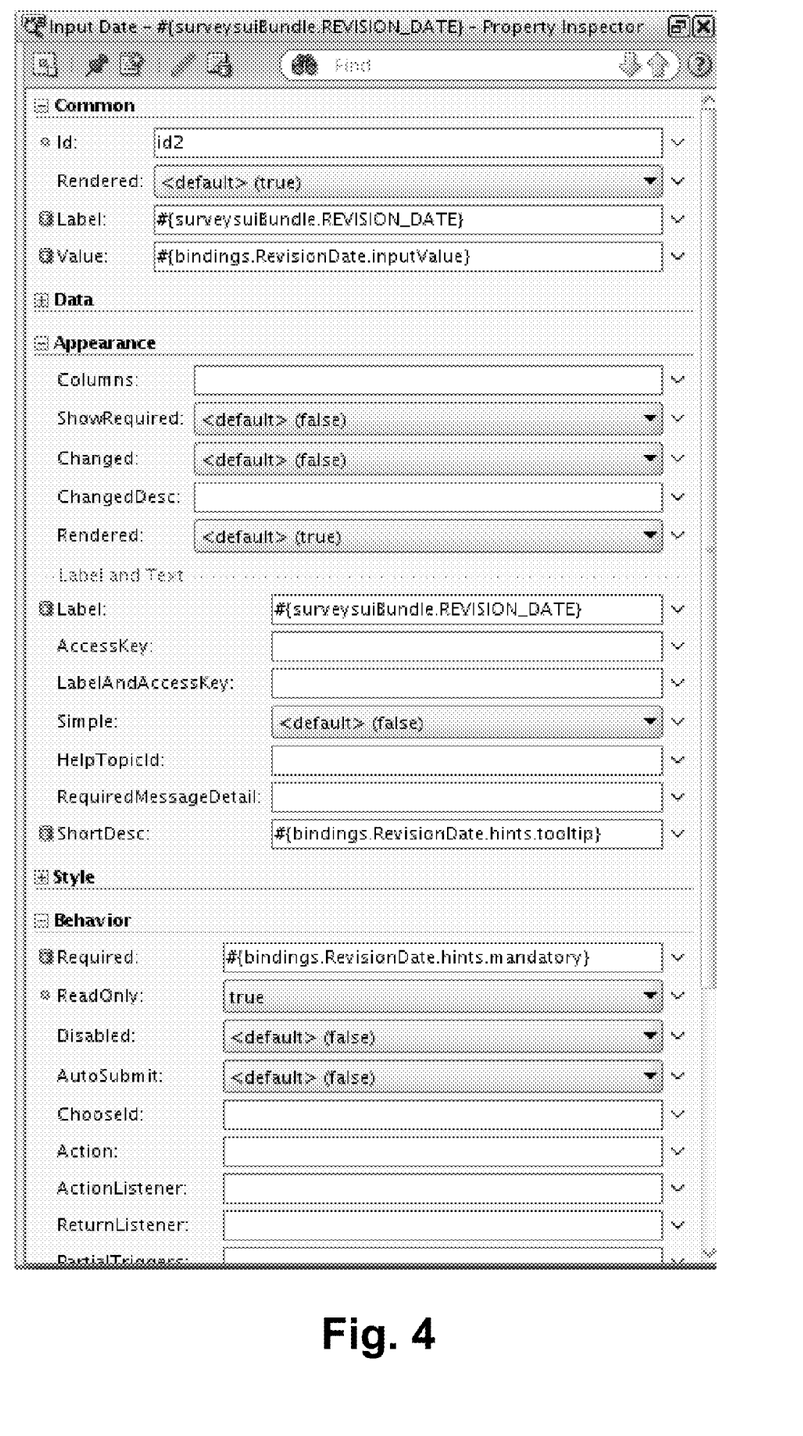
FIG. 4 shows a partial list of properties that need to be set for an example field of a user interface.

In addition to the complexity involved in composing (i.e., nesting) components correctly, each component typically has properties that will need to be set correctly. This is also a very complex and time consuming task as there could be upward of 30 to 50 individual properties that needs to be set. For example, FIG. 4 shows a partial list of properties that need to be set for the simple field "Revision Date" 105 of FIG. 1 in one embodiment. Further, all of the compositions and property settings are typically stored in a declarative component file, one for each page.

Figure 5:
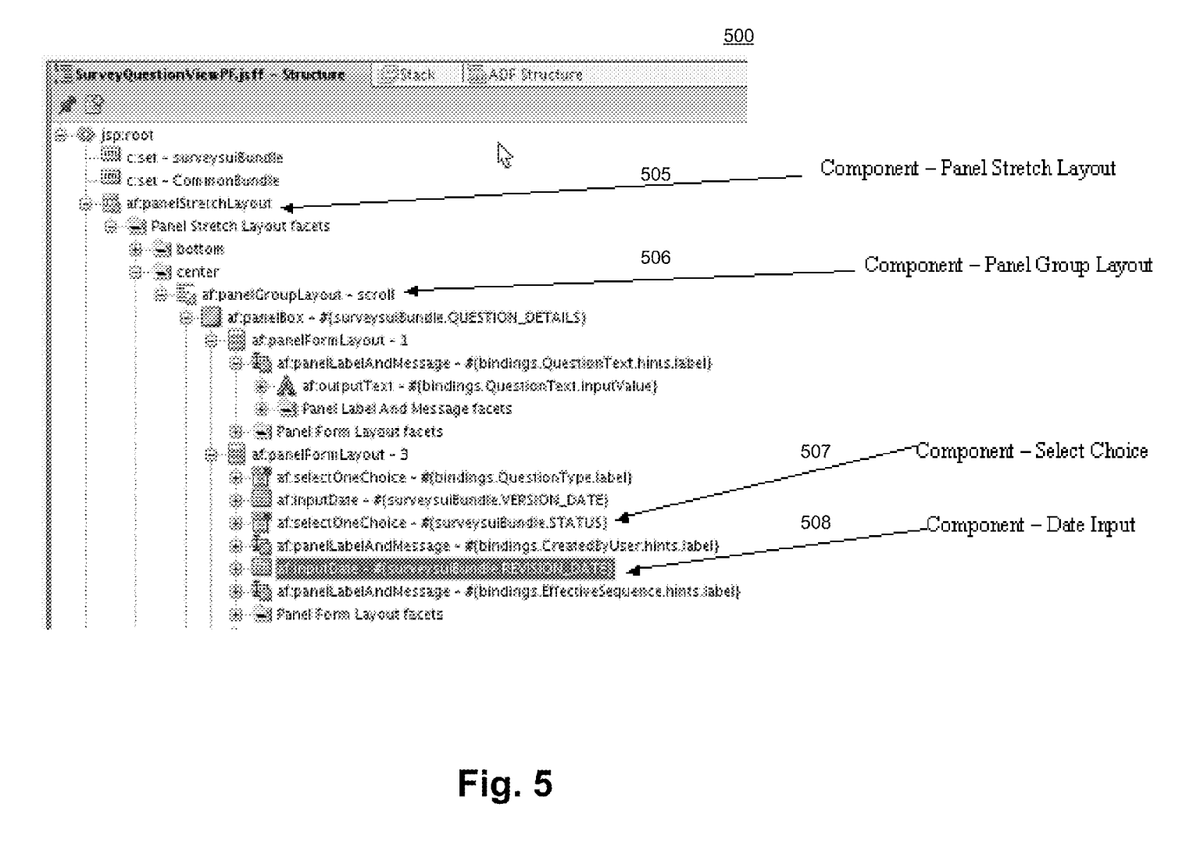
FIG. 5 illustrates a structural layout of components of a user interface.

In general, a "UI" or "web page" or "page" is itself a component composed of components that represents its visual layouts and features. For example, as illustrated in FIG. 5, the page "SurveyQuestionViewPF" 500 is a component that starts with a "Panel Stretch Layout" component 505, which is composed (embedded) of a child "Panel Group Layout" component 506. A Panel Group Layout component 506 is composed of other components, etc. A "Select Choice" component 507 and "Date Input" component 508 are considered siblings because they occur at the same level, or have the same parent, "PanelFormLayout". Therefore, a page can be considered a component or a composite component. A declarative component file represents each page, storing all the composition of components and their properties values.

The typical problems with development using components (i.e., building blocks of a pages and more sophisticated components) are: (1) choosing the appropriate components fitting specified requirements; (2) proper composition of the components; (3) properly setting the configurations of each component; (4) adhering to standards; and (5) systematic code review of components.

Each of the above numbered problems are typically handled as follows with known development systems:

(1) Given the requirements of a feature such as use cases and wireframes (pictures), a developer will look for a similar page to work from. If such a page is not found, then the developer will look through all available components to choose components that match the requirements.

(2) Knowing the components to start with is just the beginning. Often, for the page to function correctly, some components need to be wrapped inside other components, and so on. For example, an input field often sits on a formatting layer component, which sits on a panel layer component, etc. There are almost limitless ways to compose components. Some compositions will fail outright. Others may fail depending on the browser they run on. Unless the arrangements of components are given, or can be learned from a properly setup page, this is a try and error exercise.

(3) Similar to (2) above, there are many properties that need to be set for each component. Even with good examples, it is a time consuming task to set them appropriately.

(4) Most commercial software is built following some standards and conventions. These standards and conventions are there to ensure component correctness and consistency, which lead to properly functioning code and ease of maintenance. A lot of time is needed to bring awareness to the standards and conventions to developers in an organization. Moreover, it is easy to forget or overlook some standards during the coding phase.

(5) In a typical development process, it is a good practice to hold a code review meeting. The purpose of the meeting is to ensure that the completed code is done correctly and follow all standard practices. While most of the time is spent on understanding the behaviors of the code as it interacts with other components, significant amount time could be spent on making sure the declarative components are used correctly.

In contrast to the above prior art methods, one embodiment includes a BPCC or benchmark repository, a development repository, and possibly other repositories of completed and "approved" pages. The benchmark repository is a collection of pages that are considered "perfect" or desired pages within an organization. The development repository is a collection of all pages that have previously been developed for one or more software products within an organization. In one embodiment, "scoring" is used in conjunction with the benchmark repository to: (1) Aid developers in declarative component development; (2) Facilitate the code review process; and (3) Audit.

Scoring aids developers by comparing the new page a developer is working on to those that are found in the repository of benchmark pages or repository of all development pages. The scoring process returns a list of pages from each repository in order of closeness to the new page. Scoring in one embodiment is a method for comparing a newly created page to some targeted page from the repositories, and determining how faithful or how much deviation exists between the new page and the target. In one embodiment, a new page is scored against all pages in the repositories.

The scoring in accordance to one embodiment reveals how close a new page is to the benchmark repository. It also reveals its closeness to all existing pages in the development repository. It highlights what and where the deviations are, revealing any potential issues with how the components are composed, or possible bad property values. It also brings into attention new valid compositions that can be added to the benchmark repository due to their high level of desirability.

Figure 6:
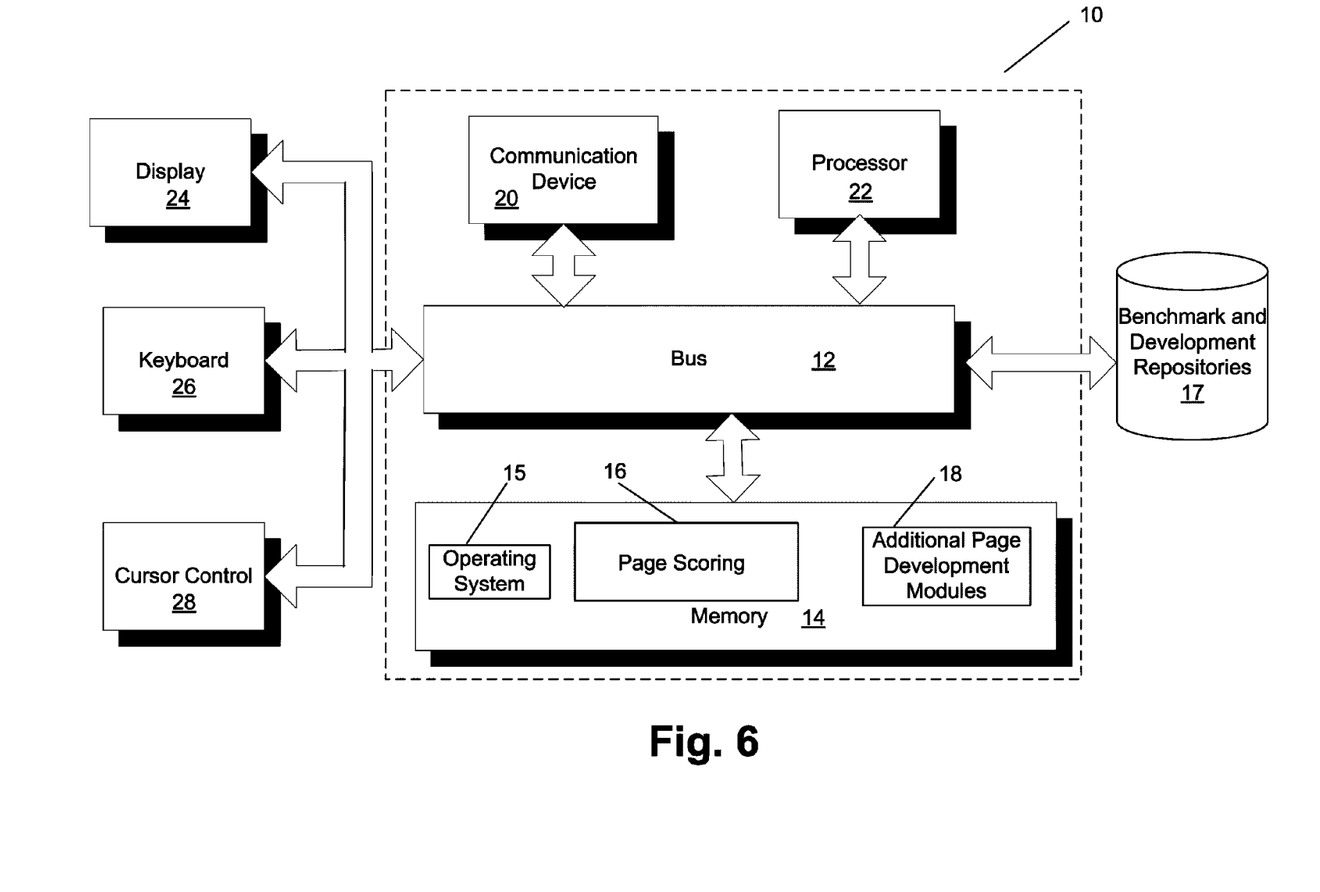
FIG. 6 is a block diagram of a computer system that can implement an embodiment of the present invention.

FIG. 6 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a page scoring module 16 that scores a page based on a benchmark repository or development repository, as disclosed in more detail below. System 10 can be part of a larger system, such as an Integrated Development Environment ("IDE"). In one embodiment, the IDE is JDeveloper from Oracle Corp. Therefore, system 10 will typically include one or more additional development modules 18 to include the additional functionality. A database 17 is coupled to bus 12 to provide centralized storage for modules 16 and 18 and store the page depositories, including the benchmark and development page repositories.

Figure 7:
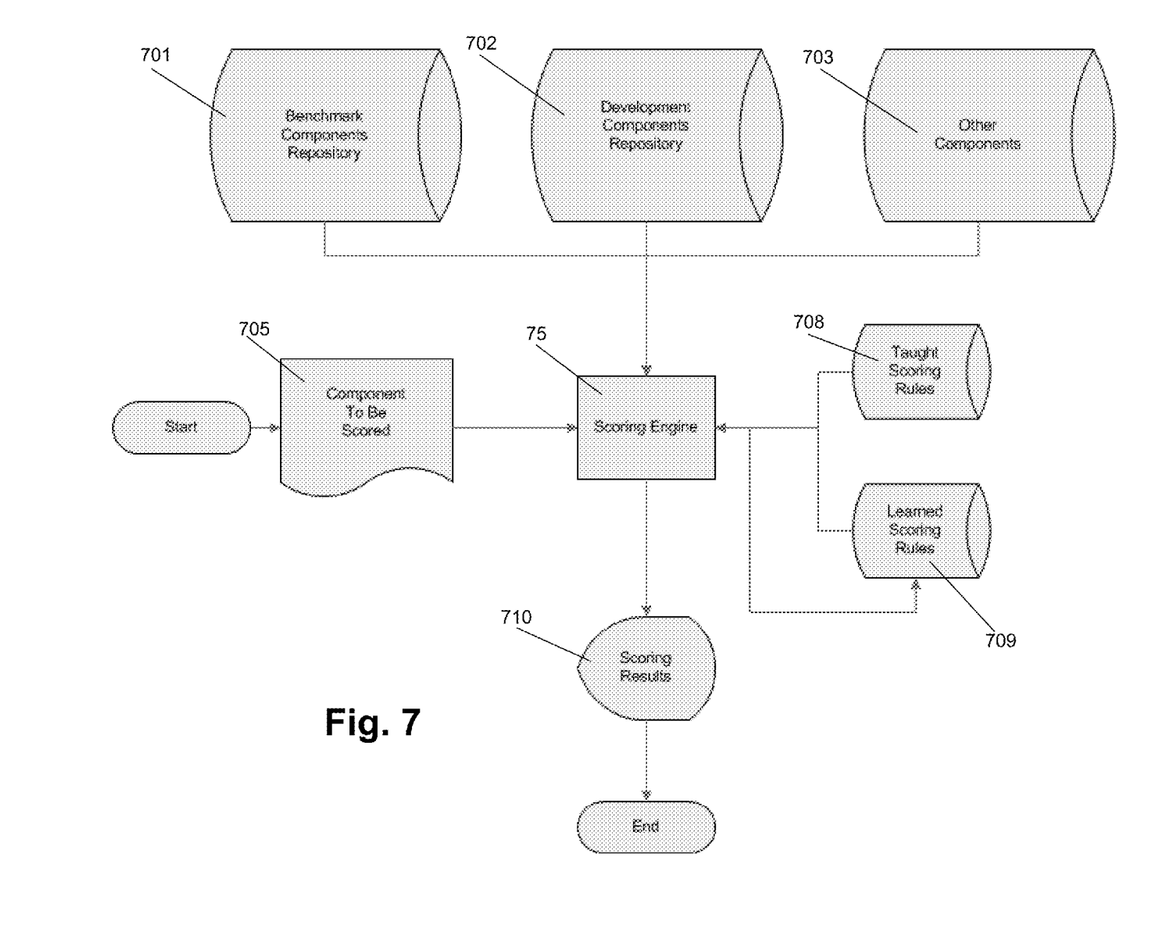
FIG. 7 is a flow diagram of the functionality of a page scoring module when scoring a component against the benchmark and development repository components in accordance with one embodiment.

FIG. 7 is a flow diagram of the functionality of page scoring module 16 when scoring a component against the benchmark and development repository components in accordance with one embodiment. In one embodiment, the functionality of the flow diagram of FIG. 7, and FIGS. 9 and 11 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

A scoring engine 75 receives the component or page to be scored at 705. It then computes a score against each component from benchmark repository 701, development repository 702, and other components 703. Other components 703 may include particular components from different product development groups or sub-groups which may have their own benchmark or page composition standards. In general, any or all of repositories 701-703 may be included, and each repository is a named collection of compositions to use for comparing a selected page. The computation of the score is based on rules that are configured 708 and rules that the scoring engine discovers during the scoring process (learned rules 709).

The scoring results 710 are normalized to percentage scale to indicate how closely matched a component is to the components found in the repositories. The higher the score, the closer the match, and vice versa. Scoring results 710 includes the list of closely matched components along with a score for that component.

Figure 8:
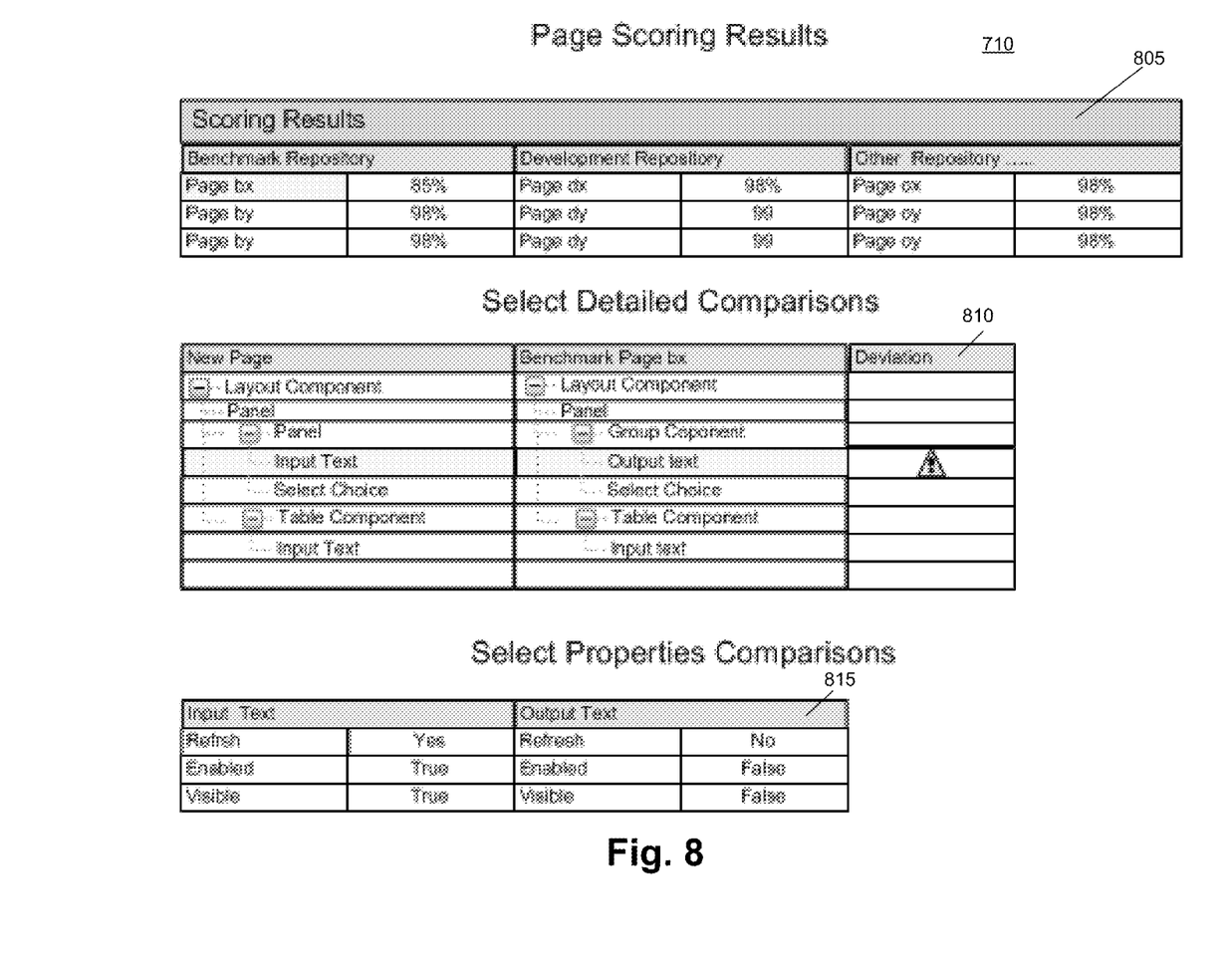
FIG. 8 illustrates an example page scoring results in accordance with one embodiment.

FIG. 8 illustrates an example page scoring results 710 in accordance with one embodiment. Scoring results 710 aids a page developer by comparing the new page a developer is working on to those that are found in the benchmark repository and development repository. Scoring is a way to compare a newly created page to some targeted page (from the repositories), and identify on how faithful (or deviated) the new page is to a target. The scoring results reveals how close a new page is to the benchmark pages. It also reveals its closeness to all existing pages. It highlights what and where the deviations are, revealing any potential issues with how the components are composed or possible bad property values. It also brings into attention new valid compositions that can be added to the benchmark repository as "benchmark" pages or components.

Scoring results 710 for a specific page includes a results 805 of pages from each repository in order of closeness to the new page. Therefore, for example, pages "bx" and "by" are used as comparison from the benchmark repository, pages "dx" and "dy" are used as comparison from the development repository, and pages "ox" and "oy" are used as comparison from the other repository. Results 710 further include a detailed comparisons 810 of a selected page from 805, which provides a component by component comparison of a selected page, and the deviations from the page. In the example of FIG. 8, the selected page is benchmark page "bx". Results 710 further include a selected properties comparison 815 for a selected component of 810 which highlights possible bad property values.

Comparison 815 provides comparisons of the property settings between two components of the same kind. For example, a component such as an "Input Text Box" has properties to define what color the foreground and background colors should be, how many characters can be displayed, a read/only status, etc. These properties of a component characterize the component in the same way physical attributes (e.g., eye color, height, hair color, etc) characterize a person. Typically, in UI development, if a component is found in a certain context, most properties are likely the same as the properties of the same component appearing in a similar context in another page. In this way, given a match of components in the scoring, it is helpful to show how their properties/characteristics also match up as shown in 815.

One embodiment also assists a developer in deciding how to compose components or setting their properties. At any point during the development of a page, the developer can inquire about what value a property typically has or what components can be nested in a given component. The answers will be presented in scoring order of benchmark pages and existing pages from the repository. The answers may be presented in the form of a pop-up window for ease of use during development.

Figure 9:
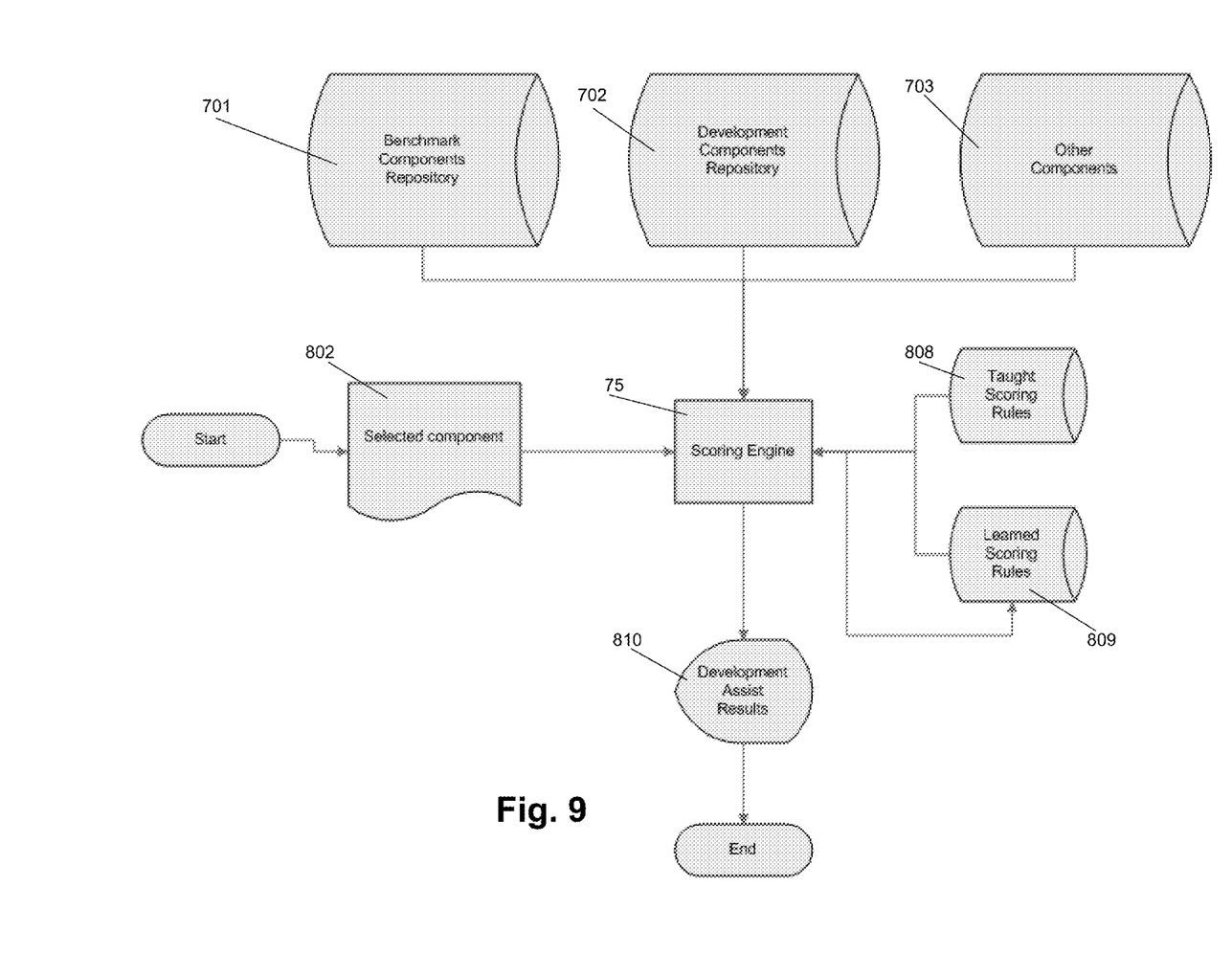
FIG. 9 is a flow diagram of the functionality of a page scoring module when assisting in component development in accordance with one embodiment.

FIG. 9 is a flow diagram of the functionality of page scoring module 16 when assisting in component development in accordance with one embodiment. The scoring engine 85 receives the selected component at 802. It then computes a score against each component from benchmark repository 701, development repository 702, and other components 703. The computation is based on rules that are configured 808 and rules that the scoring engine discovers during the scoring process (learned rules 809).

During the course of UI development, in any one place, there may be hundreds of possible components to place in developing a new page. The functionality of FIG. 9 allows a developer, at any point during the development of a page, to select a specific component and ask scoring engine 75 to provide three pieces of information. As a developer is developing a new page, the choice of components to compose is provided by this feature. Instead of picking from hundreds of choices, now it is limited to a dozen or fewer based on the proper compositions found in the repositories. The three pieces of information in one embodiment are:

(1) A list of component choices that are usually placed under or nested inside another component. For example, 'af:selectOneChoice', 'af:BooleanChoiceBox' are components that are typically placed under the 'af:panelBox' component as deduced from the usage patterns found in the repositories.

(2) A list of components that the selected component usually goes under. For example, an 'af:InputTextBox' can go under components like 'af:StretchPanel', 'af:PanelLayout', etc.

(3) A list of components that most likely appeared at the same level. For example, all text displaying components usually work together at the same level (i.e., on the same panel box component, there may be four text boxes representing an address—addr1, addr2, state, and zip).

Figure 10:
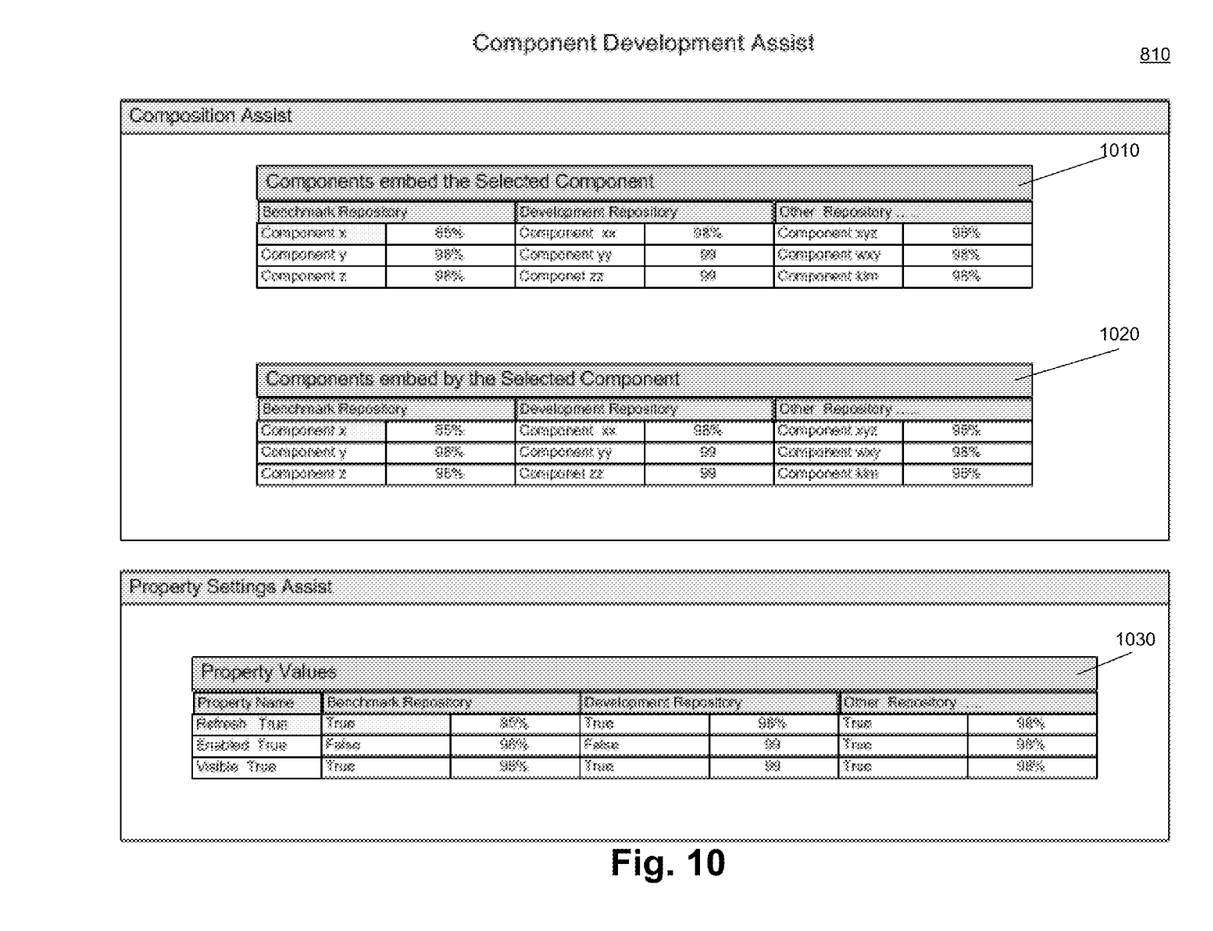
FIG. 10 illustrates an example development assist results in accordance with one embodiment.

FIG. 10 illustrates an example development assist results 810 in accordance with one embodiment. Results 810 include components are most likely nested inside the selected component at 1010 and, components most likely the selected component nested in at 1020. Results 810 further include the typical property values that the components are set as at 1030. These typical values are gather statistically from the same components appearing in the same context from the various repositories.

Figure 11:
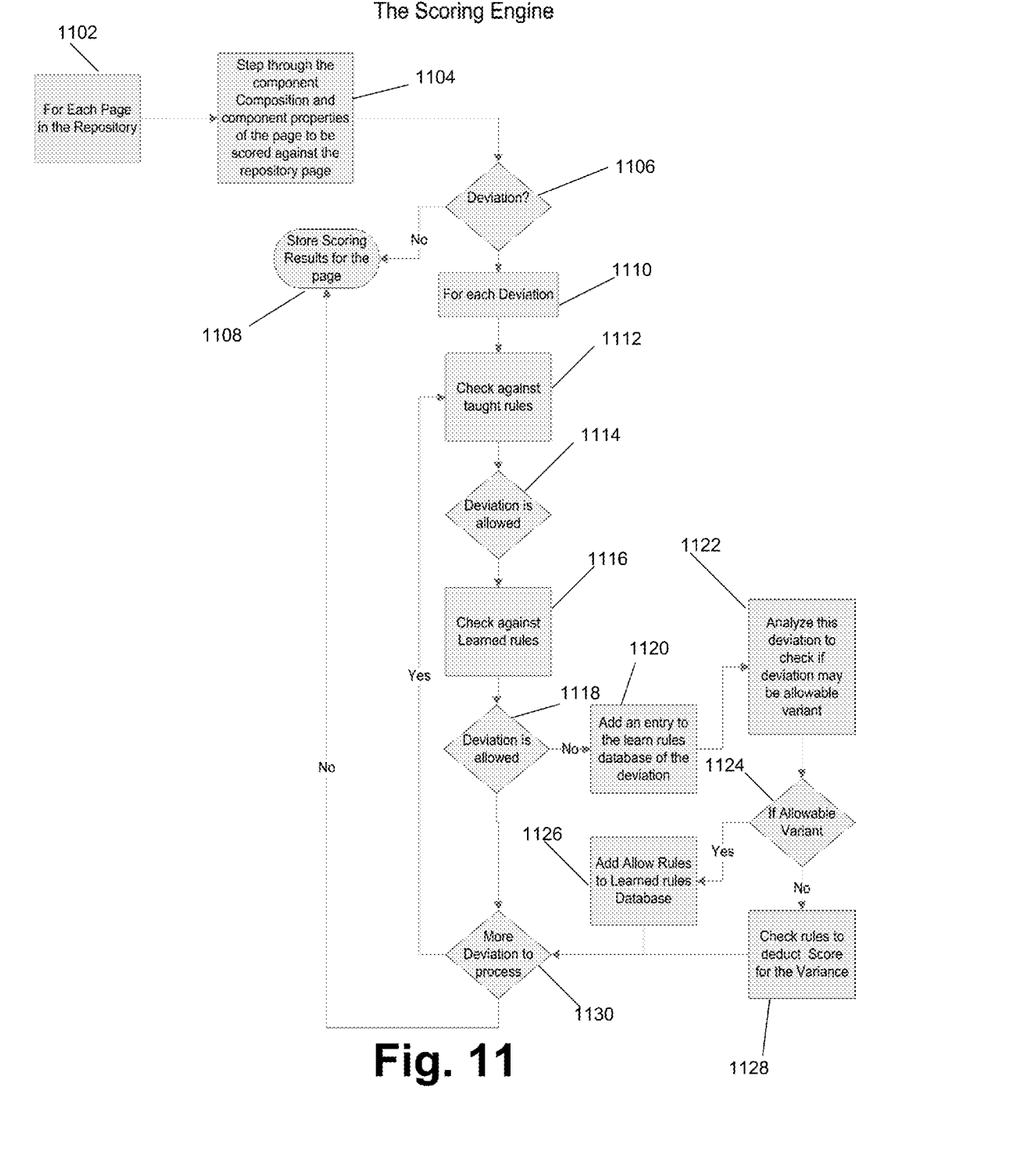
FIG. 11 is a flow diagram of the functionality of a scoring engine of the page scoring module when scoring a page or component in accordance with one embodiment.

FIG. 11 is a flow diagram of the functionality of scoring engine 75 of page scoring module 16 when scoring a page or component in accordance with one embodiment. At 1102, each page in the repository, including the benchmark, development, and other repositories, is analyzed against the current page being developed. At 1104, the component composition and component properties of the page being developed is stepped through to be scored against the repository page.

At 1106, it is determined if there is any deviation. If no, at 1108, the scoring results for the page are saved.

At 1110, for each deviation at 1106, it is checked against known rules at 1112 to determine if the deviation is allowed at 1114. The deviation is then checked against learned rules at 1116 to determine if the deviation is allowed at 1118. If the deviation is not allowed as a result of the checking at 1114 and 1118, at 1120 an entry is added to the learned rules database for the deviation. At 1122 the deviation is analyzed to determine if it is an allowable variant. If it is an allowable variant, the deviation is added as a new allowed rule in the learned rules database at 1126.

If at 1124 the variant is not allowable, at 1128, the rules are checked in order to determine how much to deduct for the score. If there are more deviations at 1130, the functionality continues at 1112.

In one embodiment, the rules are defined per repository. The rules will only come into play if during the search of the selected page composition a matching composition within the repositories is not able to be found. There are four rules: (1) Learned; (2) Explicit okay; (3) Explicit bad; and (4) Implicit. The below example illustrates how a rule is used for scoring in this embodiment. As discussed, rules are only used when a nested composition is found that did not match in the repositories.

In the example, assume a developer is evaluating what can be composed under af:panelFormLayout. Assume 'af:InputBox' is found. The learned rule is always evaluated first to see if this composition has been seen enough to allow this composition even though it is not a match and no explicit rules are created. If learned rule is allowed then no score is deducted. If an explicit rule is given, there are two possibilities: (1) okay: no score deducted; (2) bad: some units factor of score deducted.

If a rule was not specified, then the implicit rules will come into play. It will deduct 1 unit factor of score. Example of rules include:

```
<allow::af:panelFormLayout>
  <value>af:InputText</value>
  <value>af:OutputText</value>
  <value>af:BooleanCheckBox</value>
</allow::af:panelFormLayout>
<bad::af:panelFormLayout>
  <value scoreDeductionFactor=2>af:StretchPanel</value>
  <value scoreDeductionFactor=.5>af:Accordian</value>
  <value scoreDeductionAbsolutePercent=25>af:SplitPanel</value>
</bad::af:panelFormLayout>
```

In this example, there are two primary score deduction schemes: 'scoreDeductionFactor' and 'scoreDeductionAbsolutePercent' to compute the % score. The 'scoreDeductionFactor' is a deduction based on weighting the component violation. Each component violation is multiplied by this factor and summed for all violations. The total violation factor is then divided by the total number of components to arrive at the %.

For example, for a page composing of 10 components, if 2 components did not match and each has a factor deduction of 1, then the score is 80% computed as (10−(1+1))/10*100. If on the other hand one of the differences has a unit factor of 2, then the score is 70% computed as (10−(1+2))/10*100. The 'scoreDeductionAbsolutePercent' is an absolute % deduction from the score. This score directive is generally used for very serious violations to highlight to the developers the trouble spots on their pages.

As disclosed, one embodiment is a user interface generation development tool that includes scoring to aid in development. Scoring is done aggregately at the page level for all components that go into making up the page. The scoring is done at the individual property level and aggregated up to the components, which then get aggregated to the page. A page is a composition of components, and a component has one or more properties. This provides assistance to a developer in composing a page and setting values based on two things—typical composition as computed by examining all similar developed components and property value settings as set in existing components.

A developer can start with a component (e.g., the "start component"). A pop-up dialog will show in scoring order, by looking at all previous usages of the start component, what components compose (i.e., use) the "start component" and what components the start components can compose under. Further, for each property in the "Start Component", a similar scoring will show what are the typical settings.

Prior art development systems require the developer to know what and where to search for and when a similar page is found, the new page will be constructed by mimicking the similar page, which involves a lot of flipping between the "good existing" page and the new page. Code review must be done by looking at the new page, most likely comparing it manually to the "existing" page.

In contrast, embodiments of the present invention consolidate in one place (the repository) all common page patterns and new pages. Once a pattern is selected, a "wizard" can guide the composition of components and setting of property values. New pages can also be created with inquiry into the system on what "high scoring components" are nested in the current components, or what typical values are used for a property. Code review and audit can be performed by using the scoring of a candidate page to those that are in the repository. As a result, embodiments can lead to reduced development time, increased consistency, and an increase in overall product quality.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable storage medium having instructions stored thereon that, when executed by a processor, causes the processor to execute functionality comprising:
receiving a new user interface that comprises a plurality of components;
comparing the new user interface against a plurality of repository benchmark user interfaces;
determining a score for the new user interface and at least one of the benchmark user interfaces, wherein the score measures a level of deviation between the new user interface and the at least one benchmark user interface;
receiving a selection of at least one of the plurality of components;
searching the plurality of repository benchmark user interfaces for components that match the at least one selected component;
identifying components that are nested inside the matching components; and
providing a list of components selected from the nested components, based upon usage patterns found in the plurality of repository benchmark user interfaces.

2. The non-transitory computer readable storage medium of claim 1, further comprising:
generating a closeness list of user interfaces from the benchmark user interfaces in order of closeness to the new user interface.

3. The non-transitory computer readable storage medium of claim 1, the comparing further comprising comparing the new user interface against a plurality of development user interfaces.

4. The non-transitory computer readable storage medium of claim 1, further comprising, for a selected benchmark user interface, determining and displaying a component by component comparison with the new user interface and deviations between the compared components.

5. The non-transitory computer readable storage medium of claim 1, further comprising, for a selected one of the components, determining and displaying a properties comparison of a new user interface component and a benchmark user interface component.

6. The non-transitory computer readable storage medium of claim 1, further comprising for the at least one selected component of the new user interface:

comparing the at least one selected component to benchmark components of the plurality of repository benchmark user interfaces;
determining a second score of the benchmark components, wherein the second score indicates first most likely components to be nested inside the at least one selected component.

7. The non-transitory computer readable storage medium of claim 6, wherein the second score further indicates second most likely components the at least one selected component is nested in.

8. The non-transitory computer readable storage medium of claim 1, wherein the score is a percentage value.

9. A computer implemented method of user interface generation, the method comprising:
receiving a new user interface that comprises a plurality of components;
comparing the new user interface against a plurality of repository benchmark user interfaces;
determining a score for the new user interface and at least one of the benchmark user interfaces, wherein the score measures a level of deviation between the new user interface and the at least one benchmark user interface;
receiving a selection of at least one of the plurality of components;
searching the plurality of repository benchmark user interfaces for components that match the at least one selected component;
identifying components that are nested inside the matching components; and
providing a list of components selected from the nested components, based upon usage patterns found in the plurality of repository benchmark user interfaces.

10. The method of claim 9, further comprising for the at least one selected component of the new user interface:
comparing the at least one selected component to benchmark components of the plurality of repository benchmark user interfaces;
determining a second score of the benchmark components, wherein the second score indicates first most likely components to be nested inside the at least one selected component.

11. The method of claim 10, wherein the second score further indicates second most likely components the at least one selected component is nested in.

12. The method of claim 10, wherein the second score is displayed in a pop-up window.

13. A computer software development system for developing a first user interface, the system comprising:
a processor;
a storage device coupled to the processor, the storage device storing instructions to be executed by the processor and benchmark user interfaces, the instructions causing the processor to perform:
receiving the first user interface that comprises a plurality of components;
comparing the first user interface against the benchmark user interfaces;
determining a score for the first user interface and at least one of the benchmark user interfaces, wherein the score measures a level of deviation between the first user interface and the at least one benchmark user interface;
receiving a selection of at least one of the plurality of components;
searching the benchmark user interfaces for components that match the at least one selected component;
identifying components that are nested inside the matching components; and
providing a list of components selected from the nested components, based upon usage patterns found in the benchmark user interfaces.

14. The system of claim 13, further comprising:
generating a closeness list of user interfaces from the benchmark user interfaces in order of closeness to the first user interface.

15. The system of claim 13, the comparing further comprising comparing the first user interface against a plurality of development user interfaces.

16. The system of claim 13, further comprising, for a selected benchmark user interface, determining and displaying a component by component comparison with the first user interface and deviations between the compared components.

17. The system of claim 13, further comprising, for a selected one of the components, determining and displaying a properties comparison of a new user interface component and a benchmark user interface component.

* * * * *